UNITED STATES PATENT OFFICE.

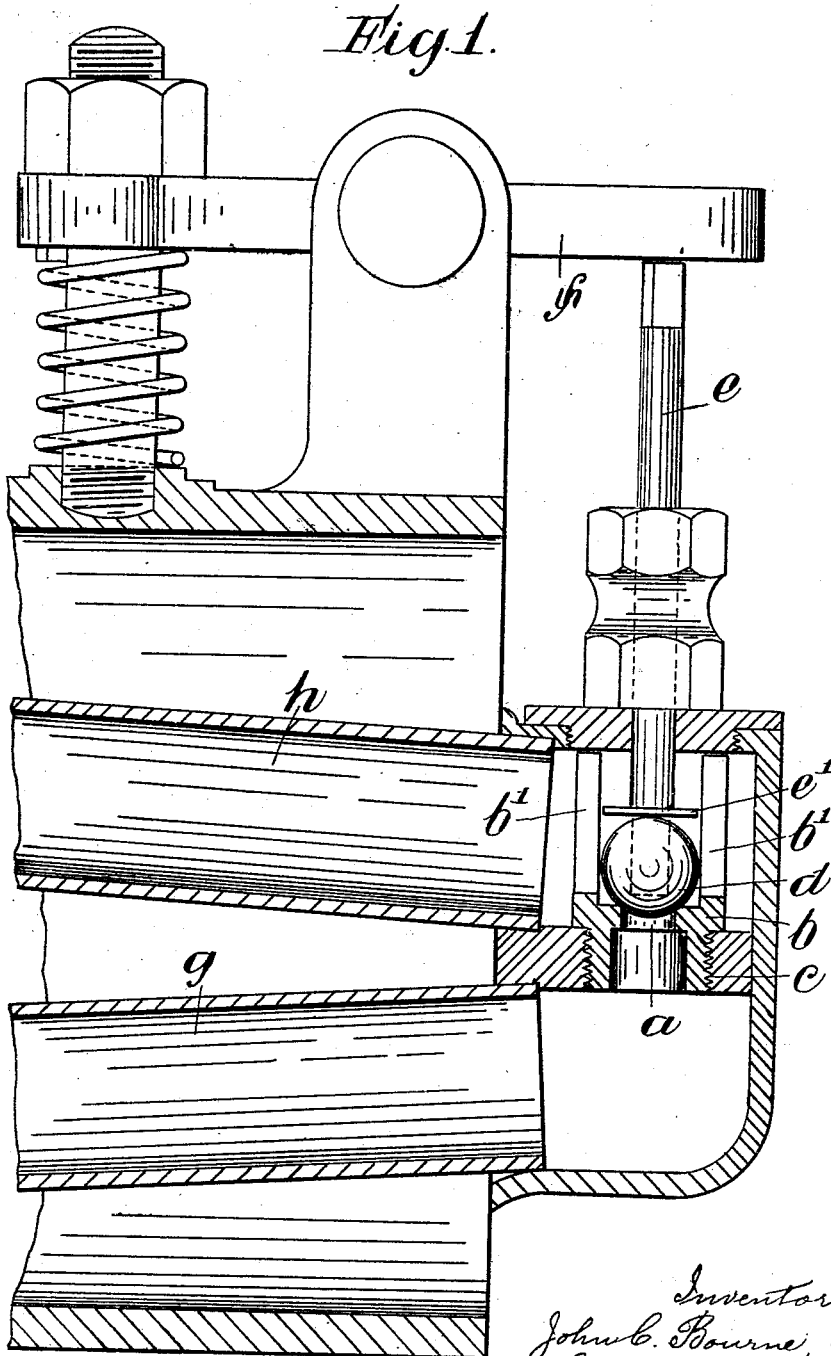

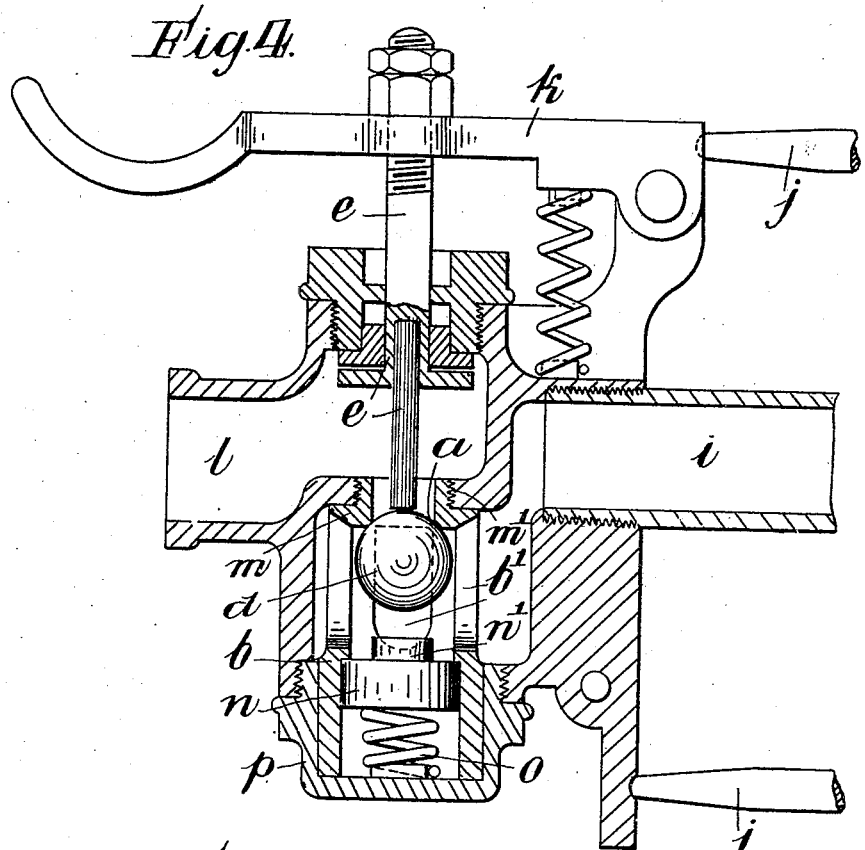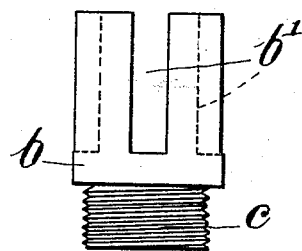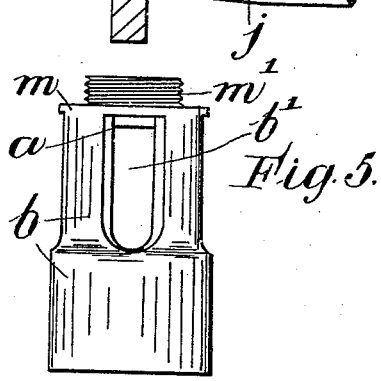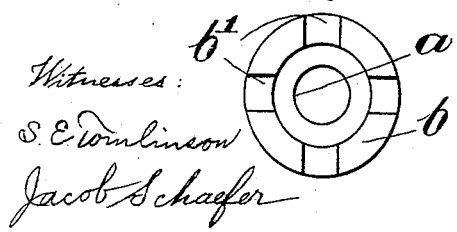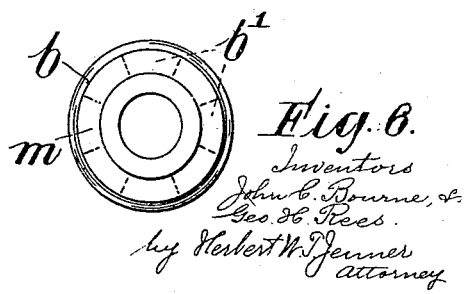

JOHN CHARLES BOURNE AND GEORGE HUGHES REES, OF LONDON, ENGLAND.

STEAM-TRAP.

No. 907,675.        Specification of Letters Patent.        Patented Dec. 22, 1908.

Application filed January 29, 1907, Serial No. 354,681. Renewed October 5, 1908. Serial No. 456,219.

*To all whom it may concern:*

Be it known that we, JOHN CHARLES BOURNE and GEORGE HUGHES REES, engineers, residing at 18 Parfrey street, Fulham Palace Road, London, S. W., England, have invented certain new and useful Improvements in Steam-Traps; and we do hereby declare the following to be a full, clear, and exact description of the invention, such as will enable others skilled in the art to which it appertains to make and use the same.

This invention relates to improvements in steam traps of the type wherein a ball valve is provided past which the water is designed to blow out, and its principal object is to more perfectly guide the ball valve on to its seating by means of an improved form of cage.

In order that this invention may be fully understood, it will now be described with reference to the accompanying drawings, in which:—

Figure 1 is a sectional side elevation of the valve end of a steam trap having this invention applied thereto, Figs. 2 and 3 are details hereinafter referred to, Fig. 4 is a similar view to Fig. 1 of another type of steam trap, illustrating a modified form of the invention, and Figs. 5 and 6 are details hereinafter referred to.

As shown in the drawings and referring more particularly to Figs. 1 to 3, wherein a trap of the Geipel type is illustrated, the valve seating $a$ is formed in an open topped cage or casing $b$ furnished with vertical slots $b'$ shown in Figs. 2 and 3 which are a side elevation and plan respectively of the cage or casing detached. This cage or casing is screwed into the trap head as at $c$ (Fig. 1), or in some cases it may be formed integrally therewith.

The valve seating $a$ is normally closed by a free ball $d$ within the cage $b$, the sides of which form guides therefor, while the lower extremity of the usual valve depressing spindle $e$ bears upon the ball under the action of the pivoted spring controlled arm $f$. A disk $e'$ is carried by the lower extremity of the spindle $e$ and fits loosely between the sides of the case $b$ which thus also serves as additional guides for the spindle $e$.

The construction and operation of the trap and valve is similar to that described and shown in the patent to W. Geipel, No. 560,491, issued May 19, 1896, in which the contraction of an expansion and delivery pipe draws the valve-seat downwardly from under the water escape valve. The ball valve is normally pressed upwards against the spindle $e$. When water from the condensed steam accumulates in the pipe $g$, the said pipe contracts and draws down the valve seat $b$. This liberates the ball valve in a manner similar to that described in the said patent to W. Geipel, and permits the water to lift the ball $d$ from its seating and pass through the slots $b'$ in the cage $b$ and out through the pipe $h$, imparting, while so doing, a turning movement to the ball $d$, which upon returning to its seating $a$, will thus present a fresh surface as is usual with ball valves. In this manner no undue amount of wear takes place upon any one or more parts of the ball, which furthermore will always find its own seating, just sufficient "play" in the cage being allowed for this.

Figs. 4 to 6 illustrate a modified form of this invention applied to a form of trap wherein the valve is retained upon its seating by the pressure of the steam and water beneath it, the contraction of the pipe $i$, when full, drawing the trap head against the rods $j$ thereby turning down the lever $k$ and depressing and opening the valve by its spindle $e$ and allowing the water to blow out through the outlet $l$. In this style of trap the cage $b$ is formed with a top $m$ wherein the seating $a$ is formed, the top $m$ screwing into the trap head as at $m'$. Slots $b'$ are formed in the side of the said cage as hereinbefore described, while the cage is closed beneath by a plunger or piston $n$ within a slightly enlarged lower part thereof, normally retained in its highest position by a spring $o$ bearing between it and the removable lower cap $p$ of the head of the trap. The piston $n$ is provided, preferably, with an upstanding reduced part $n'$.

Figs. 5 and 6 are similar views to Figs. 2 and 3, of the modified form of cage.

In operation, when the spindle $e$ is depressed and removes the ball $d$, the water passes through the seating $a$ and cage $b$ and turns the ball as hereinbefore described, while in the event of the ball being unduly depressed, it comes into contact with the piston $n$ which is also depressed thus preventing shock and possible damage to the ball.

It will thus be obvious that this invention is capable of being applied to all well known types of steam traps with but slight modifications, without departing from the spirit of this invention.

Having now described our invention, what we claim as new and desire to secure by Letters Patent is:—

1. The combination, with a trap-head provided with an outlet, of a valve seat provided with a water passage and a guide cage having lateral water passages, said seat and cage being secured inside the said trap-head, an expansion and delivery pipe secured to the said trap-head on the other side of the said valve seat from the said outlet, a revoluble ball valve normally resting on the said seat and slidable in the said cage, and a spring-controlled spindle which controls the movement of the said valve, said valve being normally pressed against its said seat and being opened automatically when the said pipe contracts.

2. The combination, with a trap-head provided with a valve-seat and a water outlet, of a revoluble ball-valve normally closing the said valve-seat, a cage for guiding the said ball-valve, a spring buffer arranged in the said cage for the said ball-valve to strike against, an expansion and delivery pipe secured to the said trap-head on the other side of the said valve-seat from the said outlet, and a spring-controlled spindle operatively connected with the said pipe so that the said valve is opened by it when the said pipe contracts.

3. In a steam trap, the combination with a valve casing communicating with the system to be drained by said trap and having a valve-seat and a water outlet, of a hollow thermostatic member whose expansion and contraction are determined by the temperature of fluid on the inlet side of the valve casing, a ball valve in said casing on the inlet side of said valve seat, a cage for guiding said ball valve, a spring buffer in said cage for said valve to strike against when moved from said valve-seat, and a spindle for operating said valve whose movements are controlled by the expansion and contraction of said thermostatic member.

In testimony whereof we affix our signatures, in presence of two witnesses.

JOHN CHARLES BOURNE.
GEORGE HUGHES REES.

Witnesses:
 GODFREY BRETTELL SHEPHERD,
 CLAUDE H. GATTEN.